United States Patent
Van Tichelen

(10) Patent No.: US 7,740,196 B2
(45) Date of Patent: Jun. 22, 2010

(54) MOBILE DEVICE FOR GRANULATING SLAG FINES

(75) Inventor: Etienne Van Tichelen, Wanze (BE)

(73) Assignee: S.A. Lhoist Recherche et Developpement (BE)

( * ) Notice: Subject to any disclaimer, the term of this patent is extended or adjusted under 35 U.S.C. 154(b) by 746 days.

(21) Appl. No.: 11/629,966

(22) PCT Filed: Jun. 21, 2005

(86) PCT No.: PCT/EP2005/052882

§ 371 (c)(1),
(2), (4) Date: Dec. 18, 2006

(87) PCT Pub. No.: WO2006/000553

PCT Pub. Date: Jan. 5, 2006

(65) Prior Publication Data

US 2007/0228195 A1    Oct. 4, 2007

(30) Foreign Application Priority Data

Jun. 24, 2004   (BE) ................... 2004/0310

(51) Int. Cl.
*B02C 9/04* (2006.01)
*B02C 19/00* (2006.01)

(52) U.S. Cl. .................................. 241/33; 241/101.74

(58) Field of Classification Search ............ 241/101.74, 241/101.75, 101.76, 33, 34, 15, 16
See application file for complete search history.

(56) References Cited

U.S. PATENT DOCUMENTS

| 5,560,551 A * | 10/1996 | Suverkrop ................... 241/34 |
| 5,655,719 A * | 8/1997 | Getz ............................ 241/27 |
| 7,325,757 B2 * | 2/2008 | Allen et al. ................... 241/19 |
| 2003/0047035 A1 | 3/2003 | McClelland, Jr. |

FOREIGN PATENT DOCUMENTS

| BR | 9102138 | 1/1993 |
| FR | 2316342 | 7/1976 |
| JP | 3005014 | 1/1978 |
| KR | 368205 | 3/2002 |
| RU | 2139359 | 10/1999 |

* cited by examiner

*Primary Examiner*—Faye Francis
(74) *Attorney, Agent, or Firm*—Charles D. Gunter, Jr.

(57) ABSTRACT

Device for implementing a method of granulating slag fines including a conveyable removable platform (1) on which there are arranged at least one device for the selective obtaining of fines (10) upstream of a feed hopper (5), a granulator (2) fed with the fines by the feed hopper (5), a storage reservoir (9) for a granulation aqueous phase feeding of the granulator (2) with the aqueous phase, a power source (4) and a monitor and controller (3) for producing granules from the fines.

15 Claims, 2 Drawing Sheets

MOBILE DEVICE FOR GRANULATING SLAG FINES

BACKGROUND OF THE INVENTION

1. Field of the Invention

The present invention relates to a device for implementing a method of granulating slag fines, in particular steelworks fines and especially with a view to recycling them.

2. Description of Prior Art

One of the final steps in steel production is its processing in a ladle in liquid form so as to purify it, in particular from the sulphurous or oxidised phases that are concentrated in the slag. For this purpose, lime, dolomite or fluidising agents (such as fluorspar—$CaF_2$, alumina, calcium aluminates, etc) are added to the ladle. This processing step in a ladle is referred to as "secondary metallurgy".

Waste results from this secondary metallurgy, referred to as class 2 waste, which does not constitute a major nuisance for the environment; this waste comprises for example CaO, MgO, $SiO_2$, $Al_2O_3$, etc. Nevertheless this waste requires to be dumped or recycled. At the present time dumping is becoming less and less possible given the more and more strict regulatory constraints with regard to the environment. It is particularly the fines, particles with a size less than 10 mm, in particular with a size less than 5 mm, whose solution poses a problem.

During recycling in an electric furnace, a large part of the slag fines (<5 to 10 mm) is sucked into the flue gas discharge system and mixed with the furnace dust. The slag fines then take on heavy metals and other class 1 elements. This dust with a high heavy metal content must then be sent for dumping as class 1, which represents an additional cost of approximately 50% compared with class 2 dumping. This recycling option is all the more prohibitive as the difference in costs between class 1 and class 2 is tending to increase.

In the case of recycling by means of agglomeration belts well known to person skilled in the art, the presence of this dust may serve as seeds for the appearance of dioxins downstream, which often makes this method of eliminating fines impossible.

Moreover, the discharge of dust during the loading of furnaces, due to the ascending thermal current, constitutes a source of nuisance for the environment and a real danger to the operators.

An alternative solution to dumping these slag fines, respectful of the environment and the safety of the operators, consists of agglomerating this dust so as to make it possible to recycle it in the steelmaking process and to prevent its being given off at the time of charging of the furnace since the agglomerates formed are heavier than the dust. The most simple method and the least expensive is granulation, for example in a rotary dish or a drum.

Adding to the dust an aqueous suspension based on calcomagnesian products, with any optional additives, promotes the cohesion of the granules, which then have sufficient mechanical strength to prevent any subsequent emission of dust.

A steelworks with a capacity of 1,000,000 tonnes/year of steel may generate approximately 6,000 tonnes/year of secondary metallurgy slag dust, which represents an hourly production of less than one tonne of fines. Here fines or slag dust means the granulometric fraction of this slag with a size of less than 10 mm.

In order to process this small output of dust, it is possible to have recourse to a granulation unit with a size adapted to this small output, but this would consequently be not very productive and also expensive in terms of labour.

In order to reduce this labour cost, it would also be possible to provide a large installation, but it would be used sporadically. This solution is also not acceptable since the installation would often function transiently, starting up and stopping, the stoppage periods also being prejudicial to the correct functioning of the equipment. The investment cost would also be disproportionate compared with the requirements.

Since neither a large installation functioning sporadically nor a small one functioning in an unproductive and expensive fashion can be envisaged, the main problem to be resolved for the device according to the invention is therefore to procure an installation where the labour costs are low, like those of a large installation, whilst operating relatively continuously in order to reduce the operating downtime, and which is adapted to the small outputs of fines to be recycled in the steelmaking industry.

SUMMARY OF THE INVENTION

To resolve this problem, there is provided according to the invention a device as indicated at the start comprising, as components, at least:
- a feed hoper (5) receiving the fines,
- granulation means (2) supplied with the said fines through the said feed hopper (5),
- a storage reservoir (9) for an aqueous phase, containing at least one granulation additive and supplying the said granulation means (2) with the said aqueous phase, so as to produce granules from the fines,
- means (7) of discharging the granules produced,
- an energy source (4), in particular for the device to be self-sufficient in operation,
- means (3) of monitoring and controlling the above-mentioned components, the device also comprising a removable conveyable platform (1), on which the said elements are all arranged and ready to be used.

Consequently the device according to the invention makes it possible, through its mobility, to implement the granulation method in situ on several different metallurgical sites, in order to reprocess the fines by recycling in steelmaking under economically very competitive conditions, that is to say with low operating and transport investment costs. In addition, processing these fines in situ avoids pollution by discharge during transport and reduces the risks to the surrounding personnel. Such a totally self-contained mobile installation is capable of travelling very easily and is operational as soon as it arrives on site.

In the patent application US 2003/0047035, a method of recovering metals at high temperature is implemented in a mobile device. Unfortunately, the device disclosed partly in this document consists of several elements disposed on several conveyable platforms, which requires installation on arrival on the site. This is because the various elements must also be connected together in order to be able to function, and such a device requires a large free surface on site in order to receive all this equipment, requiring an installation time that is absolutely not insignificant. The need to use several vehicles represents a constraining transport cost and the requirement in terms of personnel is also proportional at least to the number of vehicles. In addition, as the device is designed to be mounted on the ground, this may entail laborious installation since the ground is not necessarily flat everywhere.

According to the invention, the components of the granulation device being already all connected together on the single platform, the only procedure to be followed in situ consists merely of stabilising it, possibly connecting it to a water supply source and programming the various operating parameters in the monitoring and control means according for example to the quantity of material to be processed and the expected size of the granules. Maintenance and installation representing minimal cost since a single man can take care of it, the installation time and the space necessary are reduced, and transport is also inexpensive.

The drawbacks mentioned above, relating to the large size of functional granulation equipment compared with the small production of slag fines, are also avoided. Such a mobile self-contained device offers great flexibility of use on the steelmaking site, either close to the production of the slag fines or close to a temporary storage area; it also makes it possible to recycle the annual production of fines from several steel works without having to have recourse to the transportation of these fines to a grouping centre.

In a particularly preferential embodiment, the removable conveyable platform is the bed of a standard trailer or semitrailer and all the components of the device are enclosed in the trailer or semitrailer. Standard trailer or semitrailer means according to the invention that it has dimensions that enable it to travel on the road without being considered to be exceptional transport. This enables the device according to the invention to be taken anywhere on the steelmaking site where the fines to be processed are situated and avoids using expensive and limiting exceptional transport.

It has therefore been necessary to maximise the size of the equipment and to optimise its arrangement in order to manage to satisfy this constraint of high capacity of fines to be processed in a small space, for example that of a lorry trailer.

In addition, the bed of the trailer or semitrailer can also be partially lowered. The lowered bed enables a wider range of machinery to load the fines into the feed hopper. For a capacity of 10 tonnes/hour the size of the feed hopper and the diameter of the granulating dish requires the use of a trailer with a lowered bed, moreover easier of access. It is obvious that it is possible to provide mobile installations with a capacity of less than 10 tonnes/hour. It is also clear that this equipment also makes it possible to granulate in situ other types of dust than steelmaking slag fines.

According to another embodiment, the said removable conveyable platform is fixed to a trailer or semitrailer bed. The device can also be enclosed in a transport container of standard size, the bottom of which forms the platform, which allows transportation from vehicle to vehicle or from a transport vehicle on the ground to the appropriate operating sites.

In the most simple embodiment, the said aqueous phase is a suspension of lime or dolomite, in particular a lime slurry.

By virtue of the use of a lime slurry, the granules of slag can be recycled in an electric furnace, at the rate of approximately one tonne of granules per furnace charge of 150 tonnes, or in a ladle, at the rate of approximately 400 kg per charge of 150 tonnes. Such a recycling makes it possible to avoid the addition of flux, in particular $CaF_2$, introduced normally in secondary metallurgy.

Advantageously, the device comprises a means for the selective obtaining of fines upstream of the fines feed hopper, this means of selective obtaining of fines may be a screen, preferably an inclined vibrating sieve, or a crusher. This means of selective obtaining of fines serves to make the size of the fines that will enter the granulation device uniform.

The feed hopper of the device according to the invention is advantageously equipped with at least one vibration system in order to facilitate the flow of fines fed in. Vibration system means, amongst other things, relatively conventional vibrators, compressed air percussion systems, springs on which the hopper could rest, and any other system that guarantees a substantially even flow of the material that is to flow through the hopper.

Advantageously, the device comprises means of controlling the feed rate downstream of the said feed hopper, these being able to comprise a variable-speed conveyor belt fed by the feed hopper and a guillotine at the feed to the said belt in order to prevent any blockage.

In a particularly advantageous embodiment of the device according to the invention, the granulation means consist of a granulating dish or a drum. In addition, the granulation means may comprise a unit for atomising the aqueous phase, such as the above-mentioned lime suspension.

Advantageously, the storage reservoir may comprise a mixer and/or a pump for measuring out the said lime suspension.

Other embodiments of the device according to the invention are indicated in the accompanying claims.

Other characteristics, details and advantages of the invention will emerge from the description given below, non-limitingly and making reference to the accompanying drawings.

BRIEF DESCRIPTION OF THE DRAWINGS

In the figures, the identical or similar elements bear the same references.

DETAILED DESCRIPTION OF THE INVENTION

Figure 1:
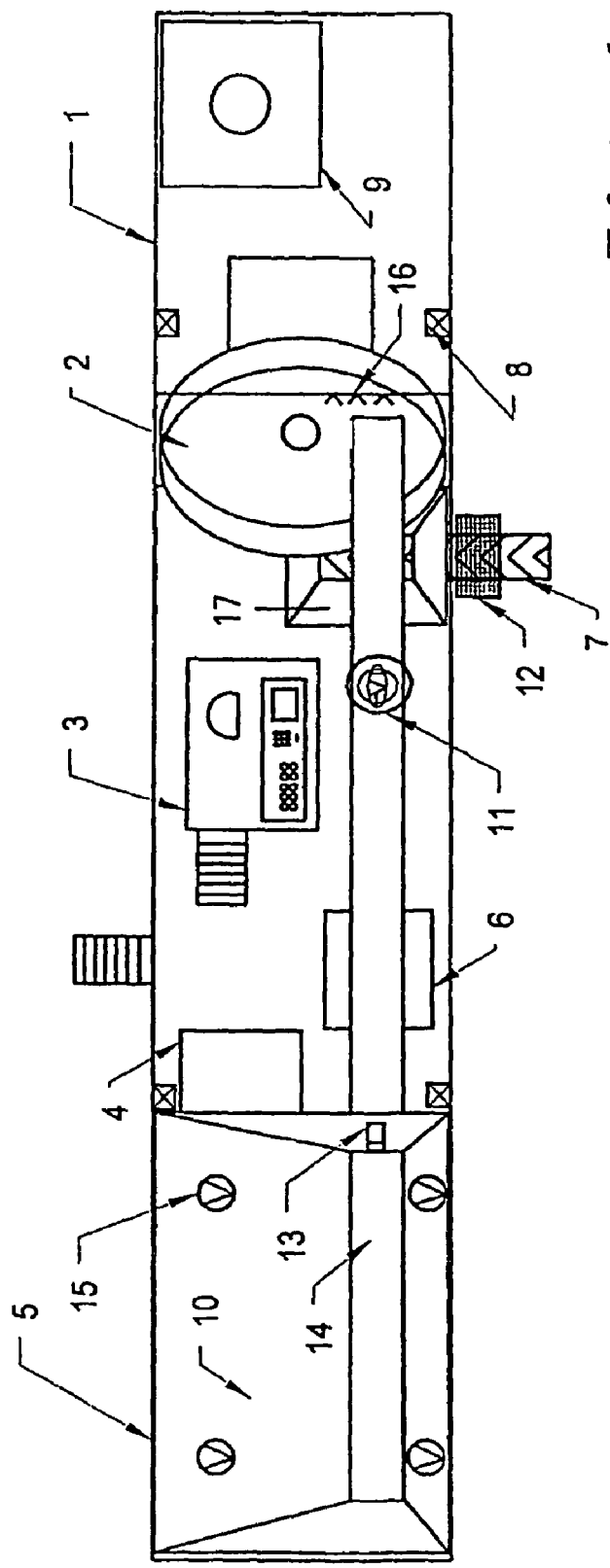
FIG. 1 is a top view of an embodiment of the device according to the invention.

FIG. 1 illustrates an embodiment of the device comprising a trailer or a semitrailer bed 1, on which the various components of the device according to the invention are arranged.

As can be seen in the drawings, in order to make the device entirely self-contained and completely mobile, all the equipment has been chosen and arranged so as to fit on the space of a lorry trailer of regulatory dimensions, therefore avoiding have recourse to expensive and restrictive exceptional transport.

Moreover, a high granulation capacity is expected by the steelmaking sector, for such a mobile installation. A throughput of 8 to 10 tonnes/hour of fines must be able to be processed.

Figure 2:
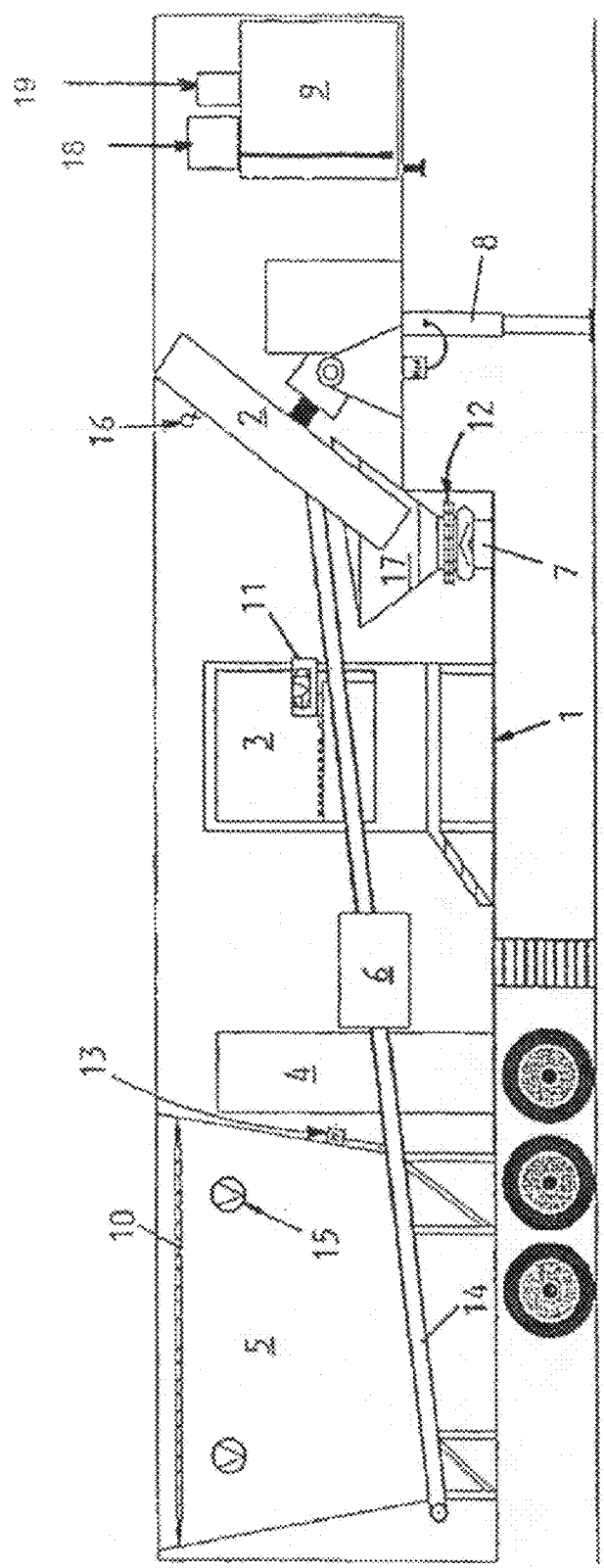
FIG. 2 is a profile view of the embodiment illustrated in FIG. 1.

The mobile granulation unit according to the invention is shown schematically in FIGS. 1 and 2. All the equipment is disposed on a trailer with a lowered bed 1, equipped with hydraulic stabilisers 8.

A system for the selective obtaining of fines 10, such as an inclined vibrating sieve, avoids supplying the installation with excessively large blocks of slag, with a size greater than 20 to 30 mm. The sieve surmounts a feed hopper 5 of approximately 10 $m^3$, in order to have enough self-sufficiency to process approximately 10 tonnes/hour of slag dust.

The inclined-wall hopper 5 is equipped with several vibrators 15 so as to guarantee an even flow onto the conveyor belt 14 downstream. This is because the speed of the conveyor belt, adjusted by a frequency variator, makes it possible to regulate the feed rate of the granulating dish 2. This is possible only if the conveyor belt is correctly filled with the product to be processed. In addition, a motorised guillotine 13 regulates the flow rate and prevents any blockage of the feed to the belt, in particular when there are blocks of slag of larger size, passed through the screen.

A weighing system 6 coupled to the belt controls the supply of dust. In addition, this weighing system makes it possible to identify any shortcomings in the supply of material to the belt and to act on the vibrators 15 or guillotine 13.

The granulation equipment is a dish 2 with a diameter of approximately 2.5 m, equipped with a unit 16 for atomising an aqueous suspension containing the solid or liquid additives, providing the granulation of the dust. The most simple example of this suspension is lime slurry. The moisture of the material to be granulated can be measured continuously, in particular by an infrared appliance 11, above the conveyor belt 14.

The installation comprises a storage reservoir 9 for the aqueous suspension, provided with a mixer, 19, as well as a measuring pump 18 supplying the atomisation unit.

The granules, typically with a size of 10 to 20 mm, are discharged from the granulating dish by overflow of the coarsest particles. The granules are collected in a receiving hopper 17 equipped with a conveyor belt 7. The latter is advantageously surmounted by a system for drying the granules, for example by infrared, in order to accelerate hardening thereof.

The mobile unit according to the invention comprises a power source 4 that provides self-sufficiency of operation of the device. The term power source means a power generator or means making it possible to connect to system power, such as that produced by the electricity system. Energy generator means for example an electricity generating set, having or not having a compressor, or any system capable of transforming the power present on the site into power directly usable by the device according to the invention. In the example of an embodiment illustrated in FIGS. 1 and 2, the mobile installation can be connected to the electrical system or to its own electricity generating set 4 and has a compressor. In addition, it comprises at its middle means 3 of monitoring and controlling the equipment. In the embodiment illustrated in this context, the monitoring and control means (3) are grouped together in a control and instrumentation cabin, which enables just one man to monitor, control and completely manage the various items of equipment of the device according to invention.

For the maximum capacity of 10 tonnes/hour, the size of the feed hopper and the diameter of the granulating dish require the use of a trailer with a lowered bed, which is moreover easier to access. The lowered bed also enables a wider range of machinery to load the fines into the feed hopper. It is obvious that it is possible to provide mobile installations with a smaller capacity than 10 tonnes/hour. Naturally also this equipment equally well makes it possible to granulate in situ other types of dust than slag fines.

Variants of certain items of equipment may be envisaged without departing from the scope of the present invention; for example, the granulating dish can be replaced by a drum or the initial screen replaced by a crusher, which also avoids the presence of large blocks of slag in the granulation installation. The latter item of equipment can even be absent if the slag is already screened or ground upstream. The aqueous suspension storage reservoir can also be replaced by a unit for manufacturing the suspension at the outset from its constituent materials.

The arrangement of the equipment on the trailer, set out in FIG. 1, can also be adapted according to the type of equipment adopted, certain items of equipment also possibly being able to be added.

Moreover, alternatives to the device on the lorry trailer can be taken into consideration, such as for example arrangement in a container, facilitating the transportation of the installation by rail, river or sea.

EXAMPLE

Tests on the granulation of secondary metallurgy slag dust were carried out on site, with a prototype installation, similar to the one described above but with a capacity of 1 tonne/hour, comprising a granulating dish 1 m in diameter.

The slag is previously screened at 10 mm; only the fines are introduced into the granulation installation, by pouring into a 0.6 $m^3$ feed hopper. This hopper is integral with a conveyor belt that conveys the fines to the granulating dish. The latter is inclined at 55° with respect to the horizontal. At the dish, an atomisation unit adds lime slurry at the rate of approximately 80 $dm^3$ per tonne of fines, for a slurry having a solid matter content of around 15%.

Granules of 10 to 15 mm are thus manufactured; they are collected by overflowing of the granulating dish onto a conveyor belt and conveyed as far as storage in "big bags", where they were kept for one month. 100 tonnes of slag fines were thus granulated, in order to carry out the recycling test.

The mechanical strength of the granules was measured at the end of the storage, before use thereof. On each sample, a crushing strength test was carried out on 10 granules with an average size of around 10 mm: this involves measuring the force corresponding to the rupture of the granule. The crushing strength values are around 60 to 90 N.

Such crushing strengths make it possible in particular to store the granules, having a density in bulk of approximately 1 $kg/dm^3$, in a bed at least 10 m high in a vertical silo, without risk of crushing of the bottom layer. Moreover, such a mechanical strength enables the granules to be manipulated and recycled whilst limiting the emission of dust. These slag granules were recycled without the emission of dust in the electric furnace and in secondary metallurgy. In the electric furnace, one tonne of granules was recycled per furnace charge of 150 tonnes. In the ladle, 350 to 400 kg of granules were added per charge of 150 tonnes. In the latter case, it must be indicated that recycling makes it possible to avoid the addition of $CaF_2$, normally introduced in secondary metallurgy as a flux.

Naturally the present invention is in no way limited to the embodiments described above and many modifications can be made thereto without departing from the scope of the accompanying claims.

The invention claimed is:

1. Device for treating slag fines comprising, as components, at least:
    a feed hoper (5) for receiving the fines,
    a discharge means (7) for discharging product,
    a removable conveyable platform (1),
wherein said device for treating slag fines is a device for implementing a method of granulating slag fines which further comprises:
    a granulator (2) supplied with the said fines from the feed hopper (5),
    a storage reservoir (9) for an aqueous medium, containing at least one granulation additive for supplying the said granulator (2) with the said aqueous medium, so as to produce granules from the fines, said discharge means for discharging product being a discharge means (7) of discharging the granules produced in the granulator, an energy source (4) for powering the components of the device in order for the device to be self-sufficient in operation, and monitoring and controlling means (3) for monitoring and controlling the above-mentioned components, said components all being present, arranged and ready to be used on said removable conveyable platform (1).

2. Device according to claim 1, characterised in that the device also comprises, upstream of the feed hopper (5), a sieve means (10) for the selective obtaining of the said fines from the said slag being fed to the feed hopper.

3. Device according to claim 2, characterised in that the sieve means (10) is an inclined vibrating sieve.

4. Device according to claim 1, characterised in that the said aqueous medium is a suspension of lime or dolomite.

5. Device according to claim 1, characterised in that the said conveyable removable platform (1) is a bed of a standard trailer or semitrailer and in that all the components of the device are contained in the trailer or semitrailer.

6. Device according to claim 5, wherein said trailer is equipped with hydraulic stabilizers, whereby the bed can be at least partially lowered.

7. Device according to claim 1, characterised in that the said conveyable removable platform (1) can be fixed to a trailer or semitrailer bed.

8. Device according to claim 1 characterised in that the device further comprises a feed rate control means for controlling the feed rate downstream of the said feed hopper.

9. Device according to claim 8, characterised in that the feed rate control means for controlling the feed rate downstream of the said feed hopper comprise a variable-speed conveyor belt (14) fed by the said feed hoper (5) and a guillotine (13) at the feed to the said belt in order to prevent any blockage.

10. Device according to claim 1, characterised in that the device also comprises, upstream of the feed hopper (5) a crusher for the selective obtaining of the said fines from the said slag being fed to the hopper.

11. Device according to claim 1, characterised in that feed hopper (5) is equipped with at least one vibration system (15).

12. Device according to claim 1, characterised in that the granulator comprises a granulating dish.

13. Device according to claim 1, characterised in that the granulator comprises a drum.

14. Device according to claim 1, characterised in that the granulator further comprises an atomisation unit (16) for the said aqueous medium.

15. Device according to claim 14, characterised in that the storage reservoir (9) further comprises a mixer (19) and a pump (18) for supplying the atomization unit (16).

* * * * *